Figure 2A:
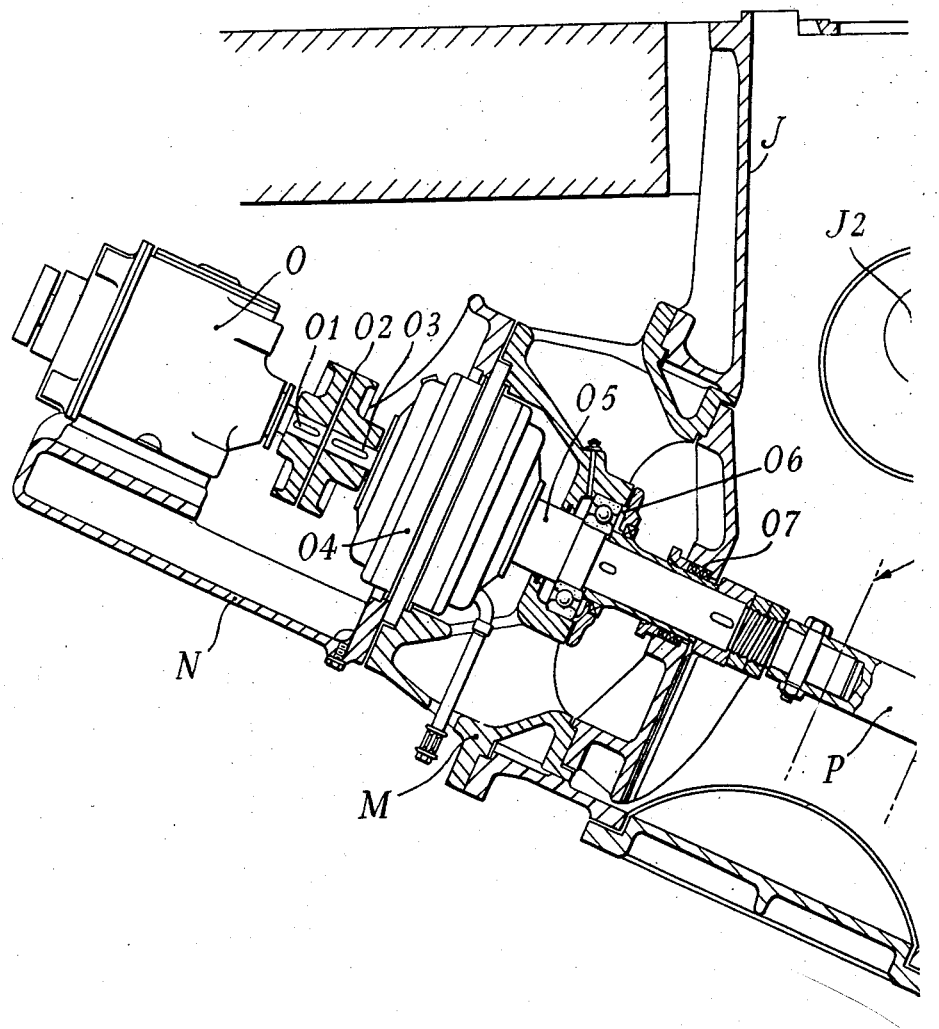

Sept. 11, 1951  S. J. MOORE  2,567,523
APPARATUS FOR FEEDING CLAY OR LIKE PLASTIC
MATERIAL TO MECHANISM IN WHICH IT IS TO BE
MOLDED INTO POTTERY OR LIKE ARTICLES
Filed June 3, 1949  3 Sheets-Sheet 1
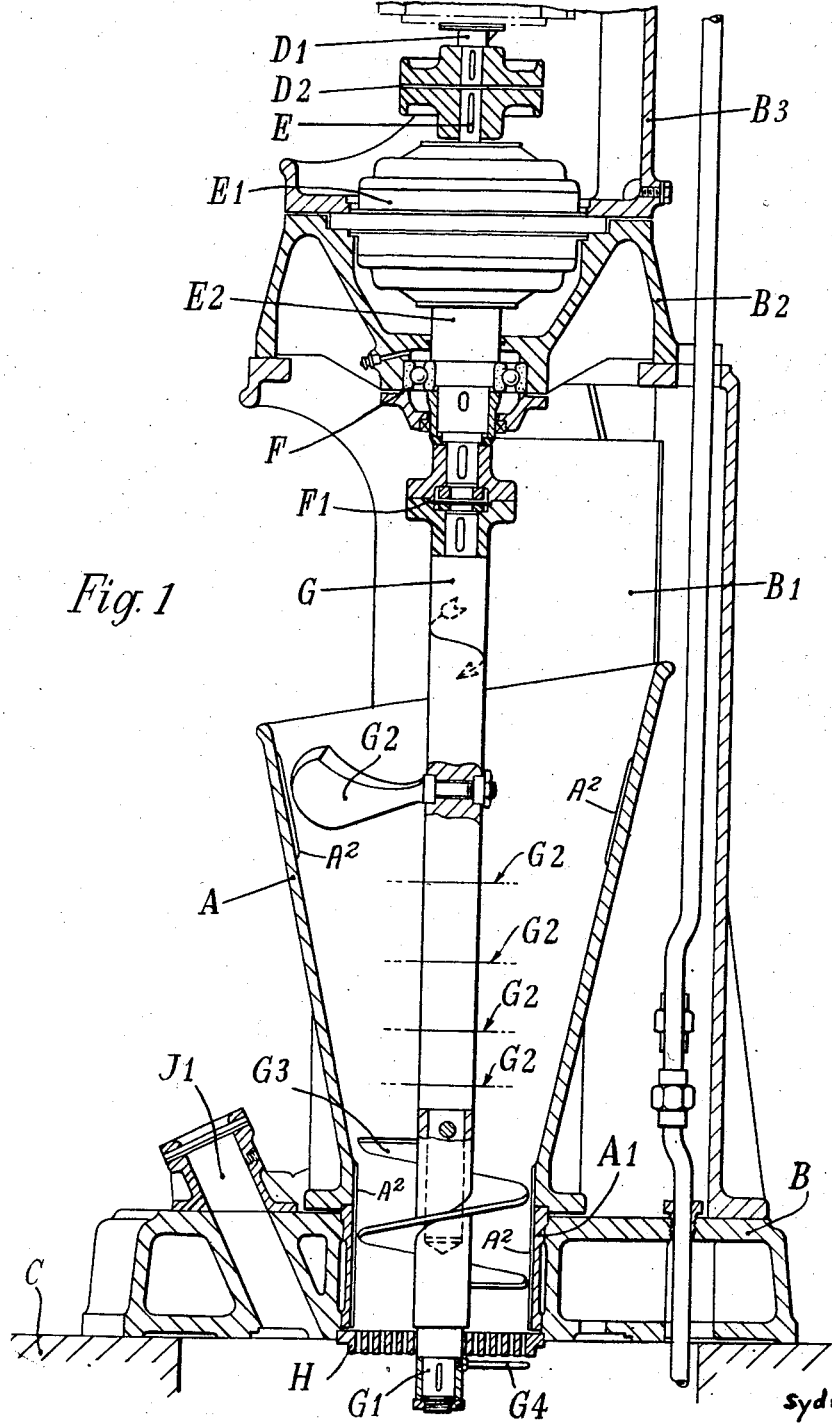

INVENTOR:
SYDNEY J. MOORE
By: Emery, Holcomb & Blair
Attorneys

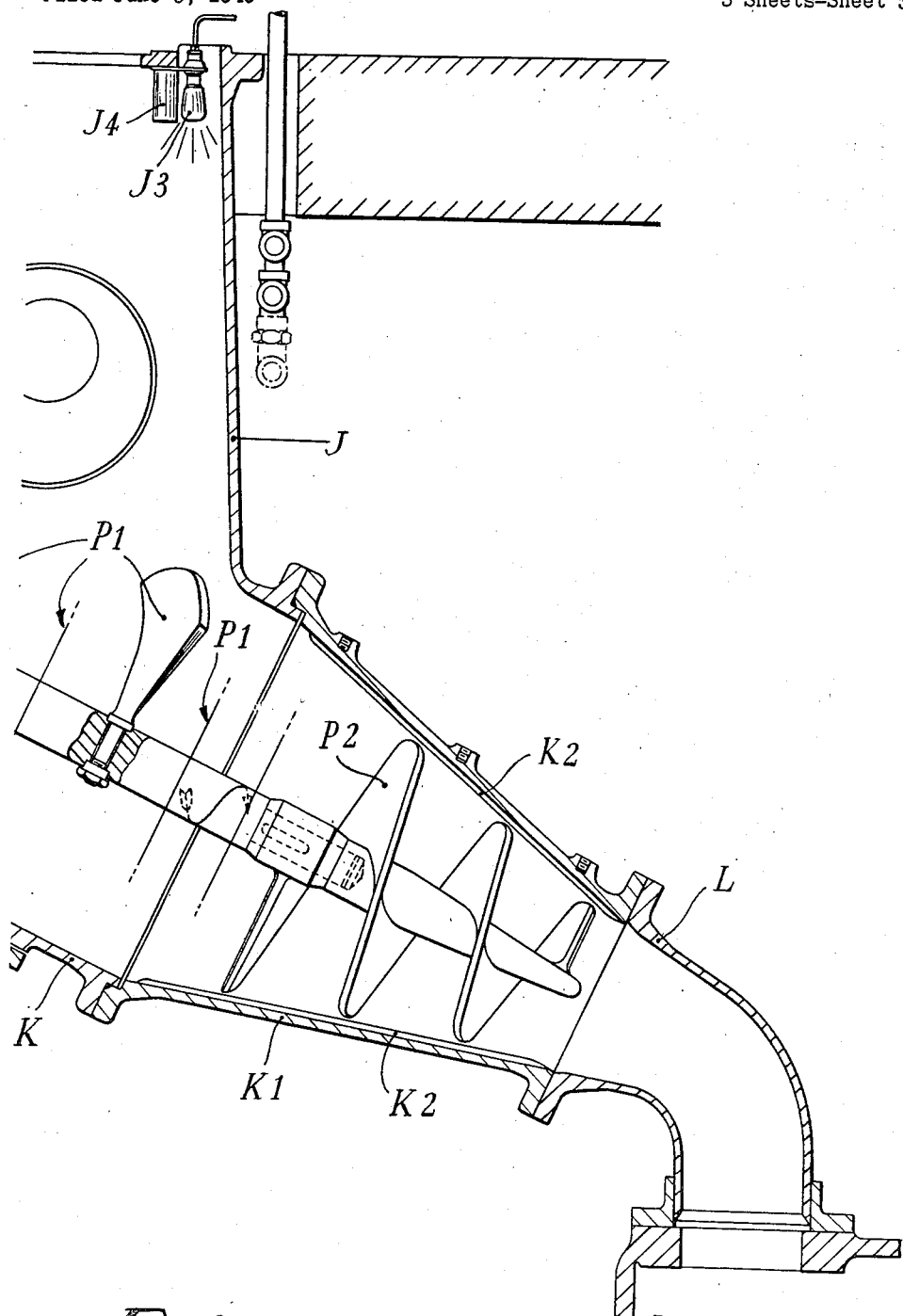

Patented Sept. 11, 1951

2,567,523

UNITED STATES PATENT OFFICE 2,567,523

APPARATUS FOR FEEDING CLAY OR LIKE PLASTIC MATERIAL TO MECHANISM IN WHICH IT IS TO BE MOLDED INTO POTTERY OR LIKE ARTICLES

Sydney Jack Moore, London, England, assignor to Sulzer Bros. (London) Limited, London, England, a company of Great Britain, and Josiah Wedgwood & Sons Limited, Stoke-on-Trent, Staffordshire, England, a company of Great Britain Application June 3, 1949, Serial No. 96,871
In Great Britain June 16, 1948

11 Claims. (Cl. 25—22)

This invention relates to apparatus for delivering clay or like plastic material (hereinafter for convenience called clay) to mechanism in which it is to be moulded into pottery or like articles (hereinafter for convenience called pottery articles), such apparatus including a delivery nozzle or aperture, the clay issuing from which is cut into sections from which the individual pottery or like articles are formed.

The invention is particularly concerned with apparatus of the type normally called a pugmill, that is to say apparatus in which the clay is kneaded and preferably also subjected to a partial vacuum in a chamber, normally termed a vacuum chamber, through which it passes on its way to the delivery nozzle, with a view to ensuring, as far as possible, that the clay issuing from the nozzle is in a consistent and homogeneous state and as free as possible from air.

The object of the invention is to provide improved apparatus for feeding the clay to mechanism in which it is to be moulded into pottery articles which will not only tend to ensure that the clay issuing from the nozzle is as consistent, homogeneous and air-free as possible, but will tend to ensure a substantially consistent rate of feed of the clay through the nozzle for a given speed of operation of the apparatus, will be readily capable of forming a unit with mechanism in which the clay is to be moulded into the pottery articles and will generally meet the requirements of apparatus of the kind in question to a high degree.

Apparatus according to the present invention for feeding clay to mechanism in which it is to be moulded into pottery articles comprises a preliminary tubular chamber having arranged coaxially within it a rotary power-driven shaft carrying kneading and feeding devices formed to knead clay introduced through an inlet opening adjacent to one end of the chamber and to force it through an exit at the other end of the chamber coaxial with the shaft, a final tubular chamber having its axis inclined to that of the preliminary tubular chamber and containing a rotary power-driven shaft coaxial therewith and provided with kneading and feeding devices for kneading clay and feeding it from an inlet opening in the circumferential wall of the final chamber to an exit opening coaxial with the shaft, and a vacuum chamber from which air is constantly withdrawn constituting a communicating passage between the exit from the preliminary tubular chamber and the inlet opening of the final tubular chamber, the arrangement being such that the clay in passing through the preliminary tubular chamber, the vacuum chamber and the final tubular chamber changes its direction of travel by less than 90°.

Preferably, the axis of the preliminary tubular chamber is substantially vertical, while that of the final tubular chamber is inclined to the vertical.

Further, a perforated plate preferably extends across the exit from the preliminary tubular chamber so that the clay is forced through the perforations into the vacuum chamber and the shaft in the preliminary tubular chamber passes through this plate and carries a cutter lying adjacent to the discharge side of the plate and serving to cut into short lengths the clay issuing through the perforations. The vacuum chamber is of larger cross-sectional area than the exit from the preliminary tubular chamber so that the clay which is forced through the perforations tends to fall freely through the inlet opening in the final tubular chamber, thus tending to avoid risk of the clay accumulating in and eventually clogging the vacuum chamber. It will be understood that the port or passage through which air is constantly withdrawn from the vacuum chamber will normally be arranged in the top of the vacuum chamber, for example in the part of the upper wall of the vacuum chamber surrounding the perforated plate.

The relative speeds of rotation of the shafts in the preliminary and final tubular chambers and/or the dimensions and theoretical feeding speeds of the feeding devices associated therewith may vary, but it will be understood that the mean rate of feed of the clay by weight from the final tubular chamber must equal the mean rate of feed by weight of clay from the preliminary tubular chamber. The rate of feed by volume from the preliminary tubular chamber may nevertheless be somewhat higher than the rate of feed by volume from the final tubular chamber, since the clay will normally be more dense, that is to say, will contain less air when it is delivered from the final tubular chamber than when it is delivered from the preliminary tubular chamber.

The invention may be carried into practice in various ways but one construction according to the invention is illustrated by way of example in the accompanying drawings, in which Figure 1 is a sectional side elevation of the upper part of the apparatus, and Figures 2a and 2b together comprise a sectional side elevation of the lower part of the apparatus.

In the construction illustrated the apparatus comprises a vertical tubular primary chamber A which is somewhat tapered so that its upper end is of greater cross sectional area than its lower end. The lower end of the chamber A leads into a cylindrical discharge passage $A^1$ which terminates in an exit opening, while its upper end is open to provide a charging opening into which the clay to be treated is fed, for example by hand.

The chamber A is supported at its lower end upon a base B which is rigidly secured to a supporting bed or floor C. Rigidly secured to or formed integral with the base B is an upwardly extending frame $B^1$ the upper end of which carries an annular housing $B^2$ on which in turn is supported an upper frame $B^3$.

The upper frame $B^3$ carries a hydraulic or other motor D having a shaft $D^1$ connected through a coupling $D^2$ to the input shaft E of a reduction gear of known type contained within a gear casing $E^1$ mounted within the housing $B^2$. The driven shaft $E^2$ of the reduction gear is supported in bearings F in the frame B and is connected by a coupling $F^1$ to the upper end of a shaft G concentric with the chamber A and passage $A^1$.

The lower end of the shaft G is supported in a perforated plate H extending across the lower end of the passage $A^1$ and extends through this plate as shown at $G^1$.

Secured to the part of the shaft G which lies within the chamber A is a series of spaced blades $G^2$ projecting radially from the shaft and serving in known manner to knead and assist in feeding downwards the clay introduced into the upper end of the chamber A as the shaft G rotates.

The form of the gearing in the casing $E^1$ is not shown since this is of known type and in itself forms no part of the present invention.

Mounted on the part of the shaft G which lies within the cylindrical passage $A^1$ is a helical conveyor or feed device $G^3$ while a blade $G^4$ is mounted on the projecting lower end $G^1$ of the shaft G immediately below the perforated plate H.

The inner surface of the cylindrical passage $A^1$ and the part of the inner surface of the chamber A immediately above it may be provided with a series of longitudinal ribs or grooves as indicated at $A^2$ tending to prevent the clay from rotating bodily in the passage $A^1$.

Secured to the base B is the upper end of a tubular vacuum chamber J into which the lower end of the passage $A^1$ thus opens through the perforations in the plate H, a passage $J^1$ being provided in the base B for connection to a vacuum pump or the like so as to maintain a substantial degree of vacuum always in the vacuum chamber J. A glass or other transparent inspection window $J^2$ may be provided in the wall of the vacuum chamber J while an electric lamp $J^3$ protected by a glass screen $J^4$ may be provided within the chamber to facilitate inspection through the window $J^2$.

The vacuum chamber J as shown is of slightly larger cross sectional area at its lower end than at its upper end and opens at its lower end directly through the circumferential wall of a final tubular chamber K the axis of which is, as shown, inclined so that it lies at an angle of less than 90° to the axis of the chamber A and passage $A^1$.

As will be seen the vacuum chamber J leads into substantially the highest point in the final tubular chamber K and this chamber comprises a substantially cylindrical upper part and a tapered lower part $K^1$ leading into a discharge passage L the upper end portion of which is slightly tapered while its lower end portion, which is substantially vertical, is cylindrical.

Rigidly mounted on and closing the upper end of the chamber K is an end member M from which is supported a frame N. The frame N carries a hydraulic motor O the shaft $O^1$ of which is connected through a coupling $O^2$ to the input shaft $O^3$ of a reduction gear of known type contained within a gear casing $O^4$ secured to the end member M. The output shaft $O^5$ of the reduction gear is mounted in bearings $O^6$ in the end member M and passes through a fluid tight gland $O^7$ into the interior of the casing K where it is connected to the upper end of a shaft P concentric with the casing K.

The shaft P carries a series of spaced blades $P^1$ projecting radially from the shaft and serving in known manner to knead and feed forward the clay entering the chamber K from the vacuum chamber J, and is connected at its lower end to a helical conveyor member $P^2$ of tapered form lying within the part $K^1$ of the chamber. The interior of the chamber $K^1$ may be provided with longitudinal ribs $K^2$ to resist bodily rotation of the clay therein.

The hydraulic motors D and O have working liquid supplied to them from a suitable pump or pumps and are either of the variable speed type or have the working liquid supplied to them in a manner permitting their speeds to be independently varied. Since the form of the hydraulic motors and the means for driving them and varying their speeds is of known type and in itself forms no part of the present invention, it will not be further described herein.

In operation clay is fed, for example by hand, to the upper end of the chamber A in which it is kneaded and fed downwards by the blades $G^2$ and then forced by the helical conveyor $G^3$ through the perforated plate H into the vacuum chamber J. As the clay emerges in small worm-like extrusions through the perforated plate H the blade $G^4$ cuts these extrusions into comparatively small lengths thus ensuring as far as possible that any air pockets in the clay are opened to the effect of the vacuum maintained in the chamber J, the clay thus subdivided falls into the chamber K and is further kneaded and fed downwards and consolidated first by the blades $P^1$ and then by the tapered helical conveyor $P^2$ so that it is delivered through the discharge passage L in a homogeneous state substantially free from air.

In most cases the clay which emerges from the discharge passage L will be automatically cut into short disc-like lengths by an automatic cutter operated in timed relationship to apparatus for forming such discs into pottery articles but, since such apparatus forms in itself no part of the present invention it will not be further described herein.

In practice it may be found preferable to arrange and agitate the apparatus so that the theoretical rate of feed of the conveyor $G^3$ is less than that of the conveyor $P^2$, in which case the actual rate of delivery through the discharge passage L will be determined by the rate of feed of the conveyor $G^3$, the conveyor $P^2$ acting to consolidate and deliver the clay supplied to it by the conveyor $G^3$.

What I claim as my invention and desire to secure by Letters Patent is:

1. Apparatus for feeding clay to mechanism in which it is to be moulded into pottery articles comprising a substantially vertical preliminary tubular chamber having a rotary power-driven shaft coaxially arranged therein carrying kneading and feeding devices formed to knead clay introduced through an inlet opening near the upper end of the chamber and to force it to and through an exit at the other end of the chamber coaxial with the shaft, a final tubular chamber positioned below said preliminary chamber and having its axis disposed at a substantial inclination to both the horizontal and the vertical and containing a rotary power-driven shaft coaxial therewith and provided with kneading and feeding devices for kneading clay and feeding it from an inlet opening in the upper end of the final tubular chamber to an exit opening coaxial with the shaft and positioned in the lower end of said final tubular feed chamber, and a vacuum chamber from which air is constantly withdrawn constituting a communicating passage between the exit from the preliminary tubular chamber and the inlet opening of the final tubular chamber, the major portions of said vacuum chamber being unobstructed to permit the clay issuing from the exit opening of said preliminary chamber to fall freely through said vacuum chamber into the inlet of said final tubular chamber.

2. Apparatus for feeding clay to mechanism in which it is to be moulded into pottery articles as claimed in claim 1 including a perforated plate extending across the exit from the preliminary tubular chamber and through which the clay is forced therefrom into the vacuum chamber.

3. Apparatus for feeding clay to mechanism in which it is to be moulded into pottery articles as claimed in claim 2, in which the cross sectional area of the vacuum chamber is greater than that of the exit from the preliminary tubular chamber.

4. Apparatus for feeding clay to mechanism in which it is to be formed into pottery articles as claimed in claim 3, in which the theoretical rate of feed of the feeding device in the preliminary tubular chamber is lower than that of the feed device in the final tubular chamber.

5. Apparatus for feeding clay to mechanism in which it is to be formed into pottery articles as claimed in claim 4, in which each of the kneading and feeding devices comprises a series of blades on a rotary shaft which knead and feed the clay to a helical conveyor coaxial therewith.

6. Apparatus for feeding clay to mechanism in which it is to be formed into pottery articles as claimed in claim 1, including means by which the rate of feed of the feed devices respectively in the preliminary and final tubular chambers can be varied.

7. Apparatus as claimed in claim 1 in which said preliminary tubular chamber has a tapering first part in which the diameter of the chamber decreases gradually from the inlet towards the outlet and a second part in which said diameter remains constant.

8. Apparatus as claimed in claim 7 in which the diameter of said final tubular chamber decreases from its inlet towards its outlet.

9. Apparatus as claimed in claim 8 in which the inner walls of the tapering part of the preliminary tubular chamber and of the final tubular chamber are longitudinally grooved.

10. Apparatus as claimed in claim 9 including means for cutting said clay into small pieces as it enters the vacuum chamber.

11. Apparatus for feeding clay to mechanism in which it is to be molded into pottery articles comprising a preliminary tubular chamber having upper and lower ends, an inlet opening adjacent to its upper end, a rotary power driven shaft coaxially arranged therein carrying kneading and feeding devices formed to knead clay introduced through said inlet opening and to force it through an exit at the lower end of said preliminary chamber coaxial with the shaft, a final tubular chamber positioned below said preliminary chamber having its axis disposed at a substantial inclination to both the vertical and the horizontal and containing a rotary power-driven feeding shaft coaxial therewith and provided with kneading and feeding devices for kneading clay and feeding it from an inlet opening in the upper end of said final chamber located directly beneath the exit in said preliminary chamber to an exit opening in the lower end of said final chamber coaxial with said rotary shaft, and a vacuum chamber from which air is constantly withdrawn, said vacuum chamber constituting a vertical communicating passage between the exit from the preliminary chamber and the inlet opening of the final tubular chamber, and means for dividing said clay into small fragments as it enters said vacuum chamber, the major portion of the vacuum chamber being unobstructed to permit said fragmented clay to fall freely through said vacuum chamber onto the upper portion of the feeding shaft coaxially located in said inclined final chamber.

SYDNEY JACK MOORE.

REFERENCES CITED

The following references are of record in the file of this patent:

UNITED STATES PATENTS

| Number | Name | Date |
|---|---|---|
| 66,277 | Ames | July 2, 1867 |
| 1,156,096 | Price | Oct. 12, 1915 |
| 1,614,526 | Lambie et al. | Jan. 18, 1927 |
| 2,078,565 | Durst et al. | Apr. 27, 1937 |